(No Model.)
J. H. KLEB.
ARTIFICIAL STONE.
No. 476,542. Patented June 7, 1892.
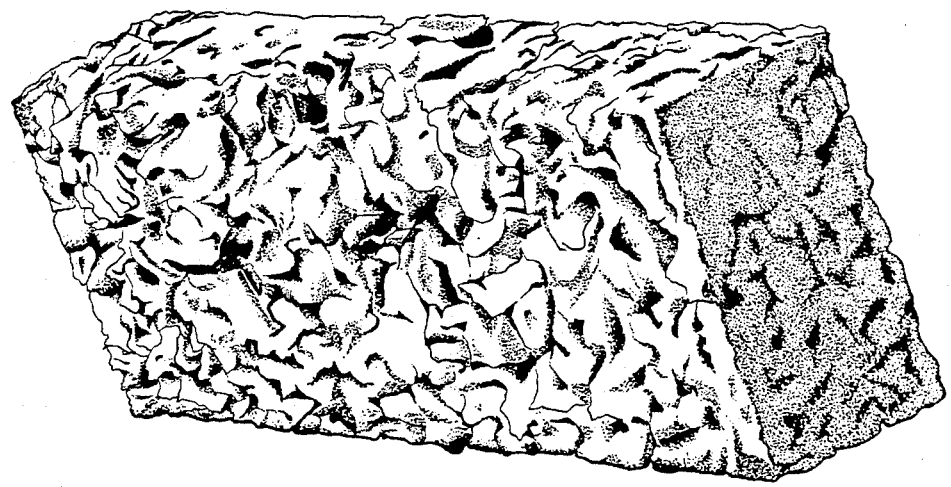
Coke
Shell
Cement
Gypsum
Water
WITNESSES:
INVENTOR:
Johann Heinrich Kleb,
BY Fred F.C. Fraentzel, ATT'Y.

UNITED STATES PATENT OFFICE.

JOHANN HEINRICH KLEB, OF NEWARK, NEW JERSEY, ASSIGNOR OF O
HALF TO FRED W. KLEB, OF SAME PLACE.

ARTIFICIAL STONE.

SPECIFICATION forming part of Letters Patent No. 476,542, dated June 7, 1892.

Application filed August 21, 1891. Serial No. 403,280. (No specimens.)

*To all whom it may concern:*

Be it known that I, JOHANN HEINRICH KLEB, a citizen of the United States, residing at Newark, in the county of Essex and State of New Jersey, have invented certain new and useful Improvements in Artificial Stone; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

The present invention has reference to an improved artificial stone; and it consists in such stone made from a suitable mixture of coke or cinders, shell, cement, and gypsum, properly mixed with water and molded in forms into any desired shape.

The article itself is illustrated in the accompanying drawing, in which a stone made from this material is represented in perspective.

The method of producing this artificial stone is as follows: Coke or cinders are mixed with a desirable quantity of small pieces of shell, preferably oyster or clam shells, and mixed with a suitable quantity of cement and gypsum to which water has been added. This soft mixture is then forced into suitable molds or otherwise formed into any desirable shape and allowed to dry. In this manner a cheap artificial stone is obtained which is much lighter than ordinary stone and which, when placed in water, will not dissolve nor will it attract moisture.

These stones can be used as pavements or as cellar-floors, in which case they are placed side by side and united by means of cement or in any other well-known manner.

These stones, owing to their light weight, are of great utility in the erection of inside walls in buildings, in which case the stones are placed upon each other in the manner of ordinary bricks, being united by means of mortar or cement. The exposed surfaces of the wall made in this manner are then treated with the usual coating of plaster. A solid wall is thus the result, which will attract no moisture and into which nails can be driven, and in which the ordinary wooden laths to which the plaster is usually attached are dispensed with. These walls are of great benefit in case of fire, as there is no possible danger of the flames eating their way through the same, as in the walls of the usual construction, in which joists and laths are used. These walls are very light, and, owing to the fact that they are solid, will sustain greater weights than the walls that are hollow. These walls when provided with plaster have the usual appearance and are of cheaper construction, making a good sanitary wall.

Having thus described my invention, what I claim is—

The herein-described artificial stone, which consists of coke or other similar material derived from combustion, combined with shell, cement, and gypsum mixed with water, substantially as and for the purposes set forth.

In testimony that I claim the invention set forth above I have hereunto set my hand this 20th day of August, 1891.

JOHANN HEINRICH KLEB.

Witnesses:
FREDK. C. FRAENTZEL,
WM. H. CAMFIELD, Jr.